UNITED STATES PATENT OFFICE.

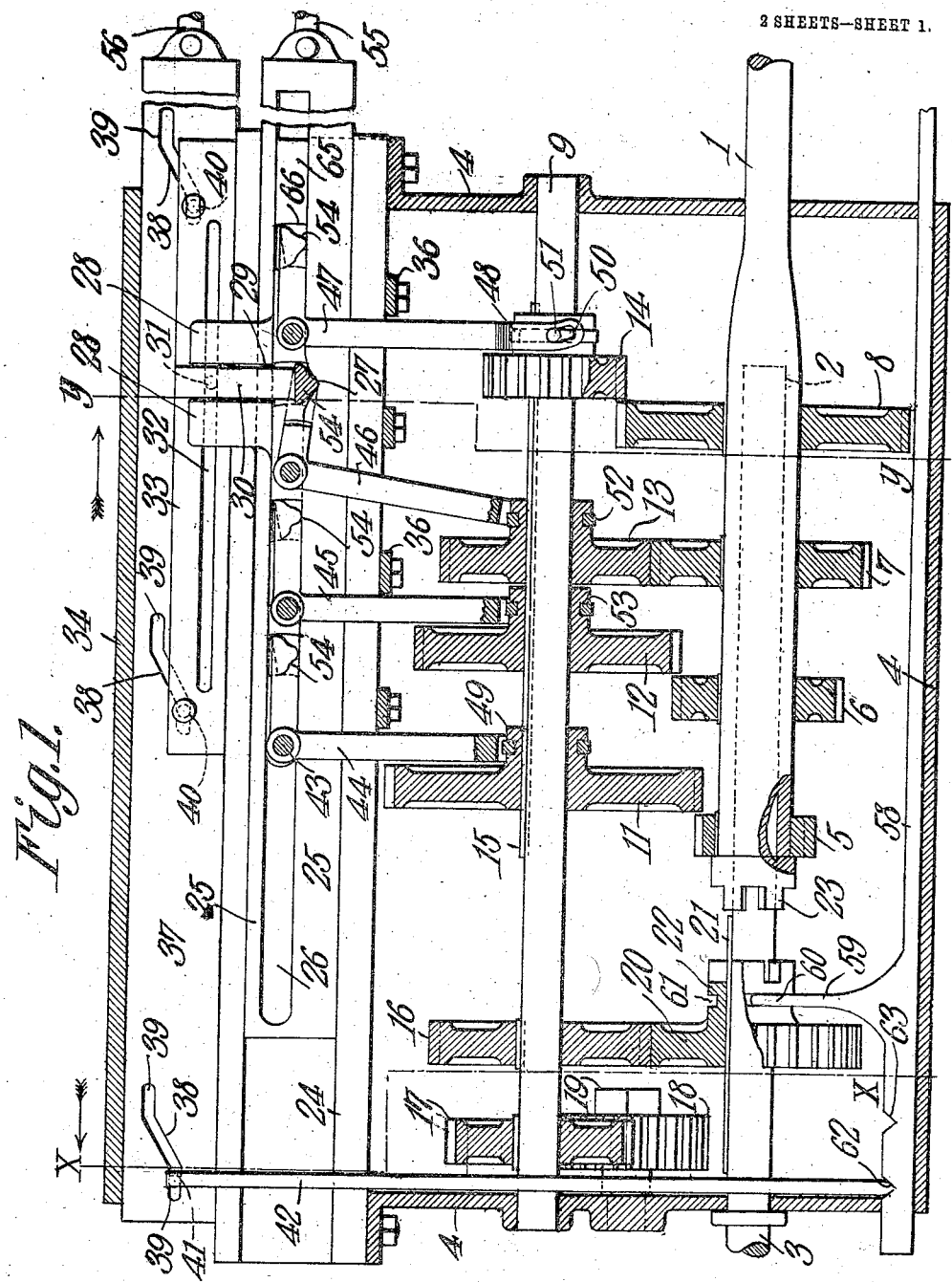

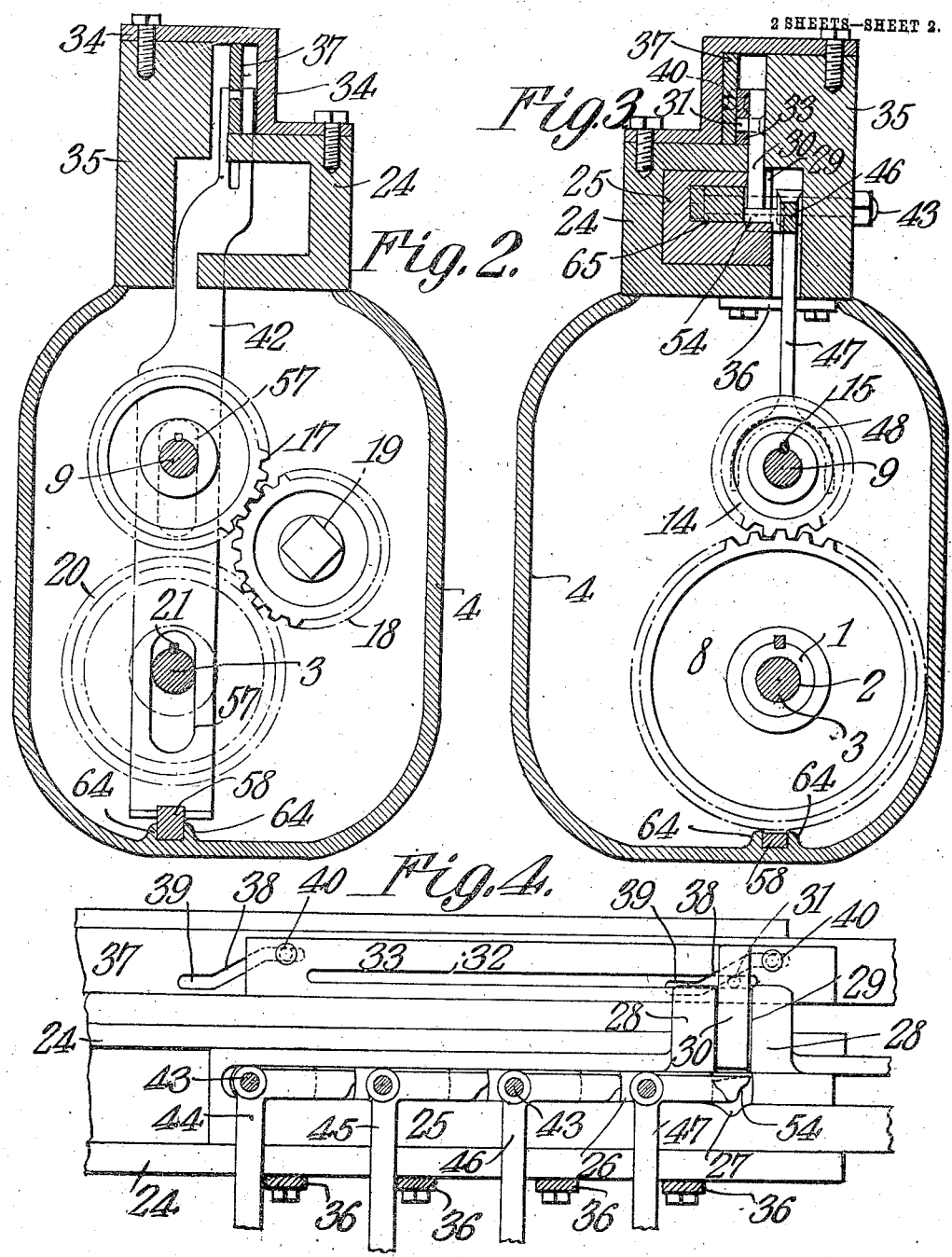

JOHN HARVEY LAIRD, OF LEXINGTON, VIRGINIA.

INTERLOCKING TRANSMISSION MECHANISM.

No. 872,520.     Specification of Letters Patent.     Patented Dec. 3, 1907.

Application filed February 18, 1907. Serial No. 357,945.

To all whom it may concern:

Be it known that I, JOHN HARVEY LAIRD, a citizen of the United States, residing at Lexington, in the county of Rockbridge and State of Virginia, have invented a new and useful Interlocking Transmission Mechanism for Automobiles, of which the following is a specification.

This invention has reference to improvements in interlocking transmission mechanism for automobiles, and its object is to provide a simple and compact device whereby the driver of an automobile may quickly and positively change the speed and power through wide ranges, or reverse the direction of the driving wheels without reversing the motor, or may, if desired, directly couple the motor to the driving wheels, at the same time positively locking the transmission gear in the desired adjusted position, such lock being positive against accidental displacement.

To this end, the invention consists in a two-part drive shaft, one part receiving power from the motor and the other part being connected to the drive wheels. The directly driven portion of the shaft is provided with a series of gear wheels of different diameters and a clutch by which it may, when desired, be directly coupled to the wheel driving end of the shaft. Adjacent to the power shaft is arranged another or countershaft containing suitable gear wheels arranged for engagement with the gear wheels on the power shaft, and this countershaft also has other gearing by means of which the direction of rotation may be reversed. In connection with the gearing carried upon the countershaft there is provided a means for shifting each individual gear independently into and out of engagement with the gearing upon the power shaft, and provision is made whereby the shifting mechanism is positively locked in both the geared position and the out of gear position so that there can be no danger of the gearing accidentally disengaging or being coupled up in a manner not designed by the operator. All the mechanism is directly under the control of the driver of the automobile through lever connections of the ordinary type adjacent to the driver's seat.

The invention will be fully understood from the following detailed description taken in connection with the accompanying drawings forming part of this specification, in which, Figure 1 is a longitudinal section through the transmission gear box, with some parts shown in elevation; Fig. 2 is a section on the line $x$—$x$ of Fig. 1, looking toward the left hand of said figure; Fig. 3 is a section on the line $y$—$y$ of Fig. 1, looking toward the right of said figure; and Fig. 4 is a longitudinal section of a portion of the shifting mechanism shown in Fig. 1 but in a different phase of operation.

Referring to the drawings, there is shown a main driving shaft 1 which has the end remote from the motor provided with a longitudinal axial socket 2 in which is journaled one end of a shaft 3, through which latter power is conveyed to the drive wheels of the automobile in the ordinary manner. The driving motor, supporting wheels and body of the automobile have been omitted from the drawings for the sake of clearness of illustration, but it will be understood that the transmission gear forming the subject of the present invention is applicable to any suitable type of commercial form of automobile.

The shafts 1 and 3 extend through a suitable casing 4 near the lower end thereof, and this casing is of such size and shape as to properly house the various parts of the transmission gear to be hereinafter described. Upon the socketed end of the shaft 1 are a number of gear wheels of different diameters, there being shown in the drawing four such gear wheels 5, 6, 7 and 8; but it will be understood, of course, that this number and the various relations of the gears to each other as to size may be changed as desired. Parallel with the shaft 1 and suitably journaled in the casing 4 is a countershaft 9 upon which are placed a number of gear wheels of different diameters, there being shown in the drawings four such gear wheels 11, 12, 13 and 14. The gear wheels 5, 6, 7 and 8 are fast upon the shaft 1, being fixed thereon against any movement except the movement imparted thereto by the rotation of the shaft. The gear wheels 11, 12, 13 and 14 are secured to the shaft 9 by means of a spline 15 and these gear wheels, while constrained to rotate with the shaft 9 because of the spline 15, may be moved longitudinally with relation to said shaft.

The shaft 9 extends beyond the end of the shaft 1 to a journal bearing in the other end of the casing 4, and inside of the casing the shaft 9 carries two gear wheels 16 and 17, both fixed upon said shaft against longitudinal movement and fast thereon for rotation with the shaft. The gear wheel 17 is in mesh with a normally idle gear 18 mounted upon a stud 19 fast in the end of the casing 4.

Mounted upon the shaft 3 within the casing there is a gear wheel 20 constrained to rotate with said shaft by means of a spline 21 and free to move longitudinally on said shaft. This gear wheel carries on the side toward the end of the main shaft 1 a clutch member 22 and the corresponding end of the shaft 1 carries a similar clutch member 23, so that when the gear wheel 20 is moved along the shaft 3 until the clutch member 22 is in engagement with the clutch member 23, then the shaft 1 is in direct connection with the shaft 3 through the two clutch members and the spline 21, so that these two shafts will then rotate synchronously and power will be transmitted directly from the motor to the drive wheels. When the parts are in this position the shafts are coupled for direct drive.

The gear wheel 20 can be shifted into mesh with the gear wheel 16, in which case power transmitted to the countershaft 9 will be transmitted by means of the gear wheels 16 and 20 to the driven shaft 3 and by it to the wheels, and it is through this connection that varying speeds from the drive shaft 1 to the shaft 9 are transmitted to the shaft 3, the arrangement of gears being such that under the condition named the rotation of the shaft 3 will be in the same direction as that of the shaft 1. When it is desired, however, to reverse the direction of rotation of the shaft 3, the gear wheel 20 is shifted still further to the left, as viewed in Fig. 1, until it engages the idler gear 18 when, as will be readily understood, the rotation of the shaft 3 will be in a direction opposite to that of the shaft 1.

In order to transmit varying speeds from the shaft 1 to the shaft 9, the gear wheels 11, 12, 13 and 14 may be coupled up to the gear wheels 5, 6, 7 and 8. For instance, the gear wheel 11 may be coupled into mesh with the gear wheel 5 when, because the gear wheel 5 is small and the gear wheel 11 is large, the speed of the shaft 9 will be correspondingly less than that of the shaft 1, but the power transmitted to the shaft 3 through the gear wheels 16 and 20, or through the reversing gear, as the case may be, will be largely augmented. If, however, it be desired to largely increase the speed of the automobile, the gear wheel 14 may be coupled into mesh with the gear wheel 8, in which case the speed of the shaft 9 will be considerably greater than that of the shaft 1 and the automobile will therefore be driven at its highest speed, since in the particular combination referred to the gear wheels 14 and 8 represent the highest speed gear provided. The other two gears represent intermediate speeds and the gears 13 and 7 may be of the same diameter, so that while direct coupling of the shafts 1 and 3 will give direct drive in one direction, the coupling of the shaft 3 to the shaft 1 through the gears 7 and 13 or through the reversing gear will give the same speed in the reverse direction.

The invention, it will be understood, is not limited to the particular arrangement of gears thus far shown and described but contemplates the use of a direct drive, a high speed gear, a low speed gear and such intermediate speed gears as may be desired, together with means for driving the automobile in either direction at any of the speeds provided for.

In order to provide for the various adjustments already spoken of and to lock the parts in the adjusted position, the invention contemplates the use of mechanism which I will now proceed to describe. Secured on the top of the casing 4 is a longitudinally arranged U-shaped frame 24 disposed at one side of the vertical plane cutting the shafts 1 and 9. Within this frame is housed an elongated block 25, near the upper edge of which and extending nearly throughout its length there is a longitudinal groove 26 formed in the face of the block 25 toward the vertical plane of the shafts 1 and 9, and at a point in the block about midway of its length and formed in the bottom wall of the groove 26 there is a notch or depression 27 having inclined walls. At a point coincident with this notch and rising from the face of the block 25 above the groove 26 are two spaced vertical lugs 28—28 flanking a recess 29 formed in the face of the block 25 at this point. The recess 29 and the two lugs 28 form a guideway for a vertically sliding bar 30, the lower end of which is movable to but not into the notch 27 and the upper end of which is provided with a laterally extending pin 31 entering a longitudinal slot 32 in a plate 33 housed in an overhanging bracket 34 fast on top of the frame 24. The overhang of the bracket 34 is fast upon a longitudinally extended fixed block 35 having one portion adjacent to the bar 30 and another portion adjacent to but spaced from the block 25, and the lower end of the block 35 is fast to but spaced from the lower edge of the frame 24 by rigid spacing links 36 suitably fastened to both parts.

The plate 33 bears against another plate 37 also housed within the bracket 34 and capable of longitudinal movement therein. This plate 37 has at certain intervals angular slots 38, each terminating in longitudinally arranged extensions 39. Two of these slots 38 are engaged by pins 40 fast on the plate 33 and the other slot 38, located near the left-hand end of the plate 37, which end is about coincident with the left-hand end of the casing 4 as viewed in Fig. 1, is engaged by a pin 41 on the upper end of a vertical bar 42 to be hereinafter described.

Mounted upon fixed studs 43 secured in the block 35 and projecting into the space between the latter and the corresponding face of the elongated block 25 are bell-crank levers 44, 45, 46 and 47, having their longer arms projecting downward and terminating in forked ends 48 straddling hubs 49 formed on the respective gears 11, 12, 13 and 14. The inner ends of the studs 43 project into the groove or recess 26 and there find support in a strip 65 seated in said groove or recess 26 and serving to maintain the sliding block 25 securely in its seat in the frame 24. This strip 65 has slots 66 at suitable intervals for a purpose which will presently appear. The forked ends of the arms of the levers 44, 45, 46 and 47 have at their extremities curved slots 50 receiving trunnions 51 projecting radially from rings 52 seated in annular grooves 53 formed in the hubs 49. The shorter arms of the bell-crank levers 44, 45, 46 and 47 terminate in lateral extensions or heads 54 approximately triangular in cross section with rounded angles and one angle projecting downward and the side faces approaching this angle in the form of a reverse curve. The lugs or heads 54 enter slots 66 in the strip 65 seated in the groove 26 and are so shaped as to readily pass into the notch 27 when the block 25 is moved longitudinally as will hereinafter appear. This block 25 is moved longitudinally through a distance sufficiently great to bring the notch 27 under any one of the lugs 54 by means of a link 55 connecting the block 25 to a suitable operating mechanism, not shown, but which may be of ordinary construction and located upon the body of the automobile within easy reach of the driver. The plate 37 is moved longitudinally within the bracket 34 by means of a link 56 also leading to a suitable operating mechanism upon the body of the automobile within easy reach of the driver. The plate 33 has its pins 40 engaged by the inclined slots 38 when the plate 37 is shifted in the proper direction, and the bar 30, through the pin 31, participates in this movement. The bar 30 may be moved longitudinally with the block 25 because of the slot 32.

Let it be assumed that the gears 7 and 13 are in mesh, as shown in Fig. 1, and that it is desirable to increase the speed of the machine by coupling the gears 8 and 14. The plate 37 is moved toward the left as viewed in Fig. 1, and the inclined slots 38 engage the pins 40 on the plate 33 and the latter is caused to move upward, carrying with it the bar 30 away from the lug 54 with the top of which it was in engagement, as shown in Fig. 1. The block 25 is then moved toward the right until the notch 27 is beneath the lug 54 of the bell-crank lever 47, as shown in Fig. 4. This movement has been participated in by the bar 30 but not by the plate 33 since the pin 31 on the bar 30 has been free to move longitudinally in the slot 32 in the plate 33. Now the plate 37 is moved toward the right as viewed in Fig. 1, and the inclined slots 38 cause the plate 33 to be moved downward, thus depressing the bar 30 until it strikes the upper face of the lug 54 and causes the bell-crank lever 47 to rock on its pivot until the lug 54 is seated in the notch 27. This operation causes the lower or forked end of the bell-crank lever 47 to move toward the left as viewed in Fig. 1 until the gear 14 has come into mesh with the gear 8. When the block 25 was moved toward the right the notch 27 was carried away from the lug 54 and the latter rode up the inclined side of this notch and was there locked with the result that the long end of the bell-crank lever 46 was moved toward the right as viewed in Fig. 1 and the gear 13 was moved out of mesh with the gear 7. A similar movement of the parts will take place whenever the block 25 is moved to bring the notch 27 beneath any particular one of the lugs 54.

It will be observed that whenever the bar 30 is elevated and the block 25 is moved longitudinally the bar 30 cannot again be depressed until this bar and the notch 27 have been moved coincident with a slot 66 in the strip 65, in which slot there is confined one of the heads 54. This construction, therefore, forms also a positive lock for the plate 37 except when the parts are in position to permit the actuation of one of the bell-crank levers. It will be apparent that with this construction it is impossible to bring more than one pair of gear wheels into mesh at any one time, and when an attempt is made to change the gears those wheels already in mesh must of necessity be moved out of gear before another pair can be put into operative relation.

Returning now to the bar 42, this bar may be supported by being provided with longitudinal slots 57 straddling the shafts 1 and 9, which, therefore, will form supporting guides for the bar, or this bar may be appropriately bent to miss the shafts 1 and 9 and be suitably supported by the end of the casing. Along the bottom of the casing there is a longitudinally sliding bar 58 having an upright arm 59 with a forked end 60 seated in a groove 61 formed in the hub of the gear wheel 20 between the latter and the clutch member 22. The bar 58 is provided with two notches 62—63 arranged in the path of the lower end of the vertically sliding bar 42, and this bar 42 when engaging one or the other of the notches 62 or 63 serves to lock the bar 58 against longitudinal movement. The bar 58 is connected to suitable operating mechanism within reach of the driver of the automobile so that it may be moved longitudinally. When the sliding bar 42 is in engagement with the notch 62 the gear wheels 16 and 20 are in engagement and are there locked. Now, by moving the plate 37 in the appropriate direction the corresponding inclined slot 38 will lift the bar 42 out of the notch 62 and the sliding bar 58 may be moved until the gear 20 is brought into mesh with the gear 18, in which position the bar 42 may be again dropped and engage the notch 63, thus locking the bar 58 against further longitudinal movement, or the bar 58 may be moved toward the right of Fig. 1 until the clutch members are in engagement, when the bar 42 may be dropped behind the end of the bar 58 and thus lock the same against longitudinal movement. The bar 58 may be suitably guided in the bottom of the casing by longitudinal ribs 64 or in any other desired way.

It is possible with this system of gearing to multiply the number of speeds almost indefinitely. For instance, should another gear wheel be mounted upon the shaft 3 and be connected to the gear wheel 20 to move longitudinally therewith and another gear wheel be mounted on the shaft 9 and fixed thereon and the proper space relation be observed between the various gears, these two pairs of gears will double the speed relation which may be obtained from shaft 1 to shaft 3, and any other desired combination of gears may be used at this point. Also, any relation of gear wheels mounted upon the shafts 1 and 9 for joint operation other than the particular combination shown may be employed, and this will give still other variations of speed. For these reasons, my invention is not confined to any particular number or relation of gear wheels upon the shafts 1, 3 and 9.

It may be observed that in transmission gear made in accordance with the present invention all the parts with the exception of the gear wheels and their shafts are either flat pieces of metal or pieces that are easily forged into shape, and, consequently, the whole structure may be made at little expense and at the same time may be made of great strength, so that danger of breakage or the necessity of repairs is reduced to a minimum.

I claim:—

1. In a power transmission mechanism, a power shaft, a driven shaft, a gear connection between the two shafts including gear wheels movable into and out of mesh with other gear wheels, shifting devices for each movable gear wheel, and a common operating mechanism for each of the shifting devices acting on any one of the shifting mechanisms in any order to the exclusion of all the other shifting mechanisms.

2. In a power mechanism, a number of power transmission elements, other power transmission elements movable into and out of gear with the first-named power transmission elements, a shifting mechanism therefor, a positive lock for holding all the movable elements out of gear, means for unlocking any one of the movable elements in any order without affecting any of the other movable elements, and means for effecting the movement of the unlocked element to operative position, also without affecting any of the other movable elements.

3. In a power transmission mechanism a number of power transmission elements, other power transmission elements movable into and out of gear with the first-named power transmission elements, a shifting mechanism therefor comprising bell-crank levers engaging the movable elements and provided with heads or lugs, a sliding bar having a longitudinal seat for all the heads or lugs on the bell-crank levers and holding them against movement, which seat has a notch or depression, means for moving the sliding bar to bring the notch or depression under any one of the lugs, and means for moving the head or lug into the notch or depression and thereby causing the bell-crank lever to move about its pivot to actuate the movable element engaged thereby.

4. In a power transmission mechanism a number of power transmission elements, other power transmission elements movable into and out of gear with the first-named power transmission elements, a shifting mechanism therefor comprising bell-crank levers engaging the movable elements and provided with heads or lugs, a sliding bar having a longitudinal seat for all the heads or lugs on the bell-crank levers and holding them against movement, which seat has a notch or depression, means for moving the sliding bar to bring the notch or depression under any one of the lugs, a bar coincident with said notch or depression, and means for actuating said bar to force the head or lug on a bell-crank lever into said notch or depression.

5. In a power transmission mechanism a number of power transmission elements, other power transmission elements movable into and out of gear with the first-named power transmission elements, a shifting mechanism therefor comprising bell-crank levers engaging the movable elements and provided with heads or lugs, a sliding bar having a longitudinal seat for all the heads or lugs on the bell-crank levers and holding them against movement, said seat having a notch or depression, means for moving the sliding bar to bring the notch or depression under any one of the lugs, a bar coincident with the notch or depression, a sliding plate engaging the bar, and a longitudinally movable plate having inclined slots engaging the first-named plate for causing it to move in a direction to actuate the bar coincident with the notch in a direction to or from said notch.

6. In a power transmission mechanism, a shifting mechanism comprising a series of bell-crank levers having heads or lugs formed on the ends of one of their arms, a longitudinally movable bar having a groove receiving all the heads or lugs on all the bell-crank levers and provided with a notch in the groove permitting the movement of the bell-crank levers about their pivots, another bar carried by said first-named bar and movable across the groove therein coincident with the notch in said groove, a longitudinally movable plate parallel with the longitudinally movable bar and having inclined grooves, and another plate having pins engaged in said inclined grooves and provided with a longitudinal slot or groove engaging a pin on the bar movable across the longitudinally movable bar.

7. In a power transmission mechanism, a power shaft, a driven shaft, intermediate gearing between said shafts, a gear wheel carried upon the driven shaft, a shifting bar connected therewith, another shifting bar having an inclined slot and movable parallel with the first-named bar, and a locking member controlled by the inclined slot and movable thereby into and out of locking relation to the gear shifting bar.

8. A power transmission mechanism for automobiles comprising a driving shaft, a driven shaft, clutch members carried by the two shafts, intermediate gearing including fixed and movable gear wheels and an intermediate shaft upon which the movable gear wheels are mounted, a shifting mechanism for the movable gear wheels on the intermediate shaft, a lock for releasing but one gear wheel at a time to the exclusion of all the others, a movable gear wheel mounted on the driven shaft and carrying the movable member of the clutch, a shifting mechanism for the last-named gear wheel and clutch member, and a lock for this last-named shifting mechanism.

In testimony that I claim the foregoing as my own, I have hereto affixed my signature in the presence of two witnesses.

JOHN HARVEY LAIRD.

Witnesses:
R. RAGLAND,
R. A. HUNT.